Aug. 2, 1938.    W. H. DEAN    2,125,491
ELECTRICAL SIGNALING SYSTEM
Filed Dec. 31, 1935    2 Sheets-Sheet 1
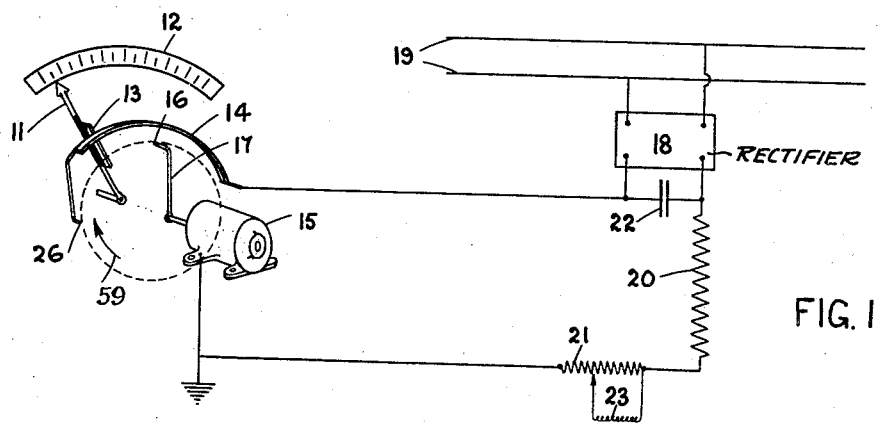
FIG. 1.
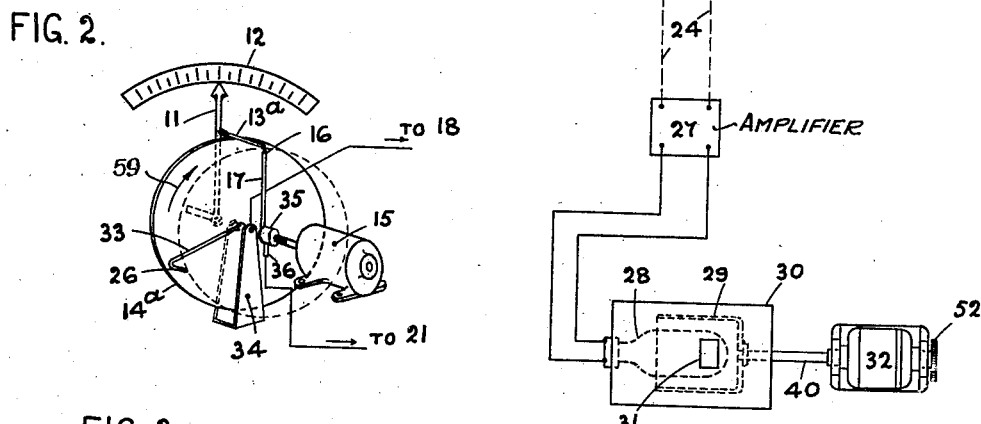
FIG. 2.
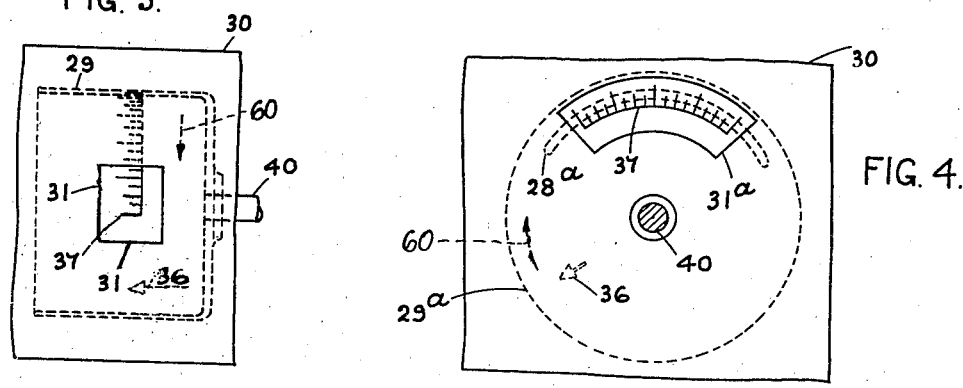
FIG. 3.
FIG. 4.
Inventor
WILLIAM HENRY DEAN,
By
Attorney Aug. 2, 1938.    W. H. DEAN    2,125,491
ELECTRICAL SIGNALING SYSTEM
Filed Dec. 31, 1935    2 Sheets-Sheet 2
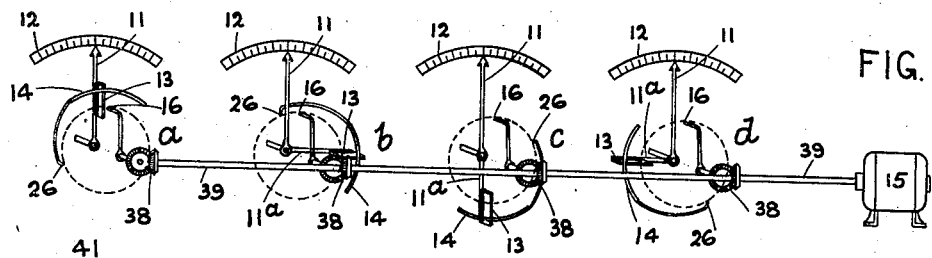
FIG. 5.
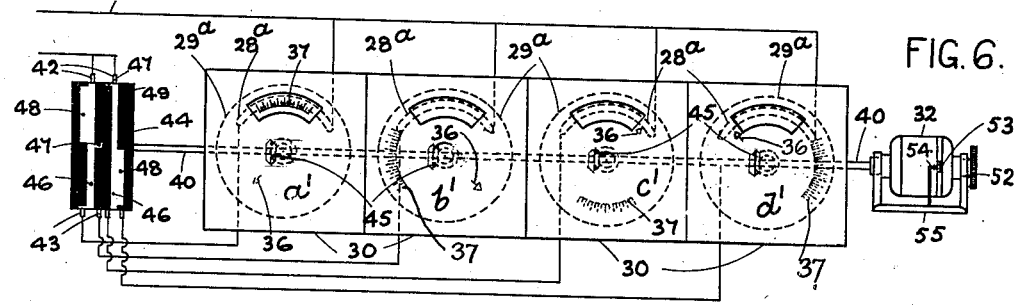
FIG. 6.
FIG. 8.
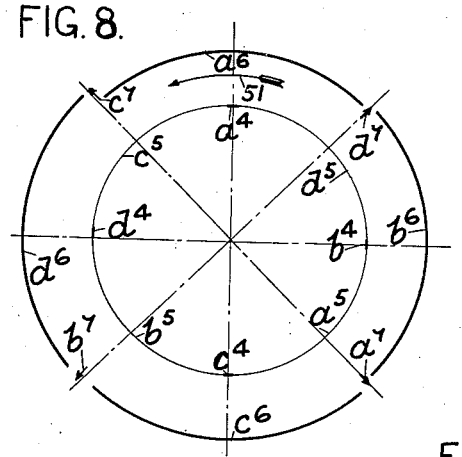
FIG. 10.
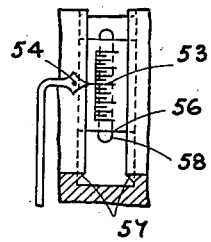
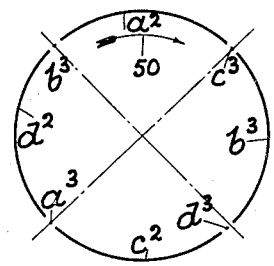
FIG. 7.
FIG. 9.
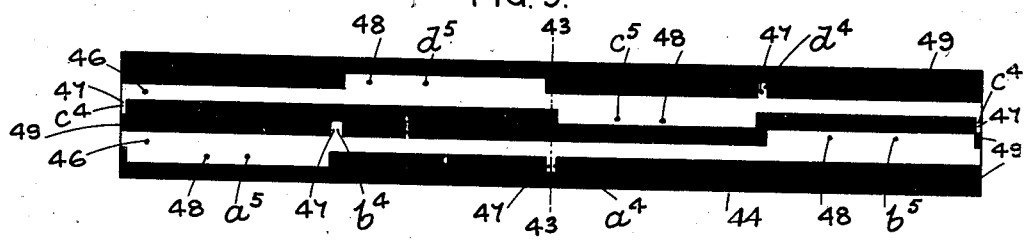
Inventor
WILLIAM HENRY DEAN,
BY
Attorneys Patented Aug. 2, 1938

2,125,491

UNITED STATES PATENT OFFICE 2,125,491

ELECTRICAL SIGNALING SYSTEM

William Henry Dean, Darlington, England

Application December 31, 1935, Serial No. 57,071
In Great Britain January 8, 1935

4 Claims. (Cl. 177—351)

This invention relates to electrical signaling systems operating on the stroboscopic principle, and has for its primary object the provision of improved means for transmitting impulse signals and the provision of improved means for receiving said signals whereby a continuous visual indication is obtained at the receiving station of the position of a moving pointer or other member in relation to a stationary scale or the like at the transmitting station.

Another object of the present invention is to provide a system primarily intended for signaling the oscillations of the pointer of a sensitive instrument without appreciably affecting the freedom of movement of said pointer.

With these and other objects in view, as will appear as the description proceeds, my invention consists in the novel methods of operation, features of construction and combinations and arrangements of parts hereinafter described and particularly defined in the claims appended to this specification.

In a signaling system according to my invention, I employ a method of originating a succession of impulse signals which consists in providing a conducting member which moves in agreement with or is formed by the pointer or the like the position of which is to be signaled, said member being arranged out of contact with but immediately adjacent to a plurality of electrodes at considerable potential difference so that, when one of said electrodes is revolved, sparks pass between said moving conducting member and said electrodes and generate a succession of impulses in the circuit connecting said electrodes, the instant in each revolution when said impulse occurs being determined by the position of said moving conducting member and hence of the pointer.

In one embodiment of my invention, the moving conducting member comprises a bridge of suitable spark-resisting material and of narrow width carried by, coupled to or formed by the oscillating pointer or the like the angular position of which is to be signaled. Where the bridge is carried by the pointer, it is insulated therefrom; but where a metal pointer forms the bridge, it is insulated from the spindle on which it swings and, where a metal pointer is balanced on a pivot so as to swing horizontally (as, for example, in a compass), the supporting pivot may be insulated or of suitable insulating material.

The conducting bridge is disposed out of contact with but immediately adjacent to a pair of electrodes at considerable potential difference, one of said electrodes being stationary and corresponding in length to the arc through which said bridge moves and the other electrode being of pointed form and carried by an arm revolved by a motor running at identical constant speed with the motor driving the receiving apparatus, the arrangement being such that the gaps between said stationary electrode, said conducting bridge and said revolving electrode are jumped by simultaneous high voltage sparks when the revolving electrode passes the conducting bridge, the angular position at which said sparks occur depending on the position of said conducting bridge and hence of the pointer. An instantaneous signal impulse is thus originated in the circuit which supplies the electrodes with high voltage current, said impulse coinciding in time with the instant the revolving electrode passes the conducting bridge and occurring once during each revolution of said electrode. An additional stationary point electrode is provided to co-act with said revolving electrode so that an index impulse is also originated once during each revolution for the purpose hereinafter described. The index and signal impulses are transmitted to the receiving station by any efficient channel of communication (for example, a telephone circuit) which is capable of faithfully transmitting the fundamental wave form of said impulses. Either carrier-wave circuits of line communication or radio may be used by arranging for the impulses to suitably modulate or key the alternating currents employed.

At the receiving station the index and signal impulses, amplified if necessary, are applied to flash a neon or similar gaseous lamp to illuminate an indicator member revolved by a motor running at identical constant speed with the motor driving the revolving electrode at the transmitting station.

It will be noticed that, as there is no contact at any time between the stationary electrode, the conducting bridge and the revolving electrode and as the pointer does not actually convey the current supply to either of the electrodes, the movements of the pointer are not appreciably affected, and my transmitting device is thus especially applicable for signaling the oscillations of the pointer of an electrical meter or other delicate instrument.

I will more fully describe my invention with reference to the accompanying drawings, wherein Figure 1 illustrates diagrammatically one example of my signaling apparatus as applied to an electrical meter having an oscillating pointer moving over a stationary scale;

Figure 2 is a part similar view to Fig. 1 illustrating an alternative form of the transmitting device; and Figures 3 and 4 show alternative forms of indicators for the receiving device.

Figure 5 is a diagrammatic view of apparatus for simultaneously transmitting the readings of four electrical meters;

Figure 6 is a diagrammatic view of apparatus for simultaneously indicating the signals received from the apparatus of Fig. 5;

Figure 7 is a diagram showing the relative angular positions of the stationary segmental electrodes and the stationary point electrodes of the transmitting apparatus of Fig. 5;

Figure 8 is a diagram showing the relative angular positions of the scales and arrows of the indicators and of the contacts around the selector switch of the receiving apparatus of Fig. 6;

Figure 9 is a development of said selector switch; and

Figure 10 is a part elevation illustrating a detail.

In the example illustrated in Fig. 1 of the said drawings, 11 is the pointer of the electrical meter or other instrument at the transmitting station, said pointer oscillating over a stationary segmental scale 12, and I provide said pointer with a conducting bridge 13 comprising a narrow strip of suitable spark-resisting material insulated from the pointer and having an outwardly-projecting knife edge parallel with the pointer. I also provide a stationary segmental electrode 14 of spark-resisting material mounted on insulating supports (not shown), said electrode being concentric with the axis about which the pointer oscillates. The driving motor of the transmitting apparatus is indicated at 15, and is arranged with its shaft in alignment with said axis and hence concentric with the electrode 14. 16 is the revolving electrode and is mounted at the end of a conducting arm 17 on the motor shaft. The space between any part of the segmental electrode 14 and the revolving electrode 16 is greater than the maximum gap which can be jumped by the voltage employed. The path of the electrode 16 lies in a plane which is perpendicular to the axis of rotation and co-incides with the plane of the edge of the electrode 14 which is next to the conducting bridge 13, and said bridge swings in a plane parallel and immediately adjacent to said edge and to the path of the electrode 16 so that the gaps between said edge and said bridge and between said bridge and said electrode are together just slightly less than the maximum sparking distance, and, when said electrodes are maintained at sufficient potential difference and the discharges suitably regulated, minute sparks pass across said gaps when the electrode 16 is exactly opposite the bridge 13. An insulating screen (not shown) preferably guards the members 13, 14 and 16.

A stationary point electrode 26 of spark-resisting material is provided, said electrode having an outwardly-projecting knife-edge and being conductively joined to the segmental electrode 14. The electrode 26 is so arranged in relation to the path of the revolving electrode 16 that a spark passes between the electrode 26 and the electrode 16 once during each revolution to originate an index impulse, said stationary electrode 26 being positioned at a predetermined angular distance in advance of the end of the arc through which the pointer 11 and bridge 13 oscillate.

The segmental electrode 14 is connected to one terminal of a full-wave rectifier 18 fed from A. C. supply mains 19, the other terminal of said rectifier being connected through a non-inductive resistance 20 of high value and a potentiometer 21 to earth and to the revolving electrode 16 by way of the casing and shaft of the motor 15 and the arm 17. The rectifier 18 is capable of providing a trickle output of steady high-voltage direct current at some 3000 to 5000 volts, and the resistance 20 is of the order of 1 megohm. The potentiometer 21 may possess a resistance of 1000 ohms and may have a fixed or variable output. A reservoir condenser 22 of a minimum of one or two microfarads capacity and capable of withstanding the high voltage is connected across the ouput terminals of the rectifier 18, and maintains the sparking voltage constantly steady by preventing the occurrence of surges due to the discharges taking place. Smoothing apparatus (not shown) is preferably also employed to eliminate all voltage ripples from the supply mains and prevent them reaching the condenser. The primary winding 23 of a transformer of suitable ratio and construction is connected across the terminals of the potentiometer 21, and the transmitting circuit (indicated at 24) is joined to the terminals of the secondary winding 25 of said transformer. The circuit 24 may be a trunk telephone circuit, and may include repeater or amplifier stations.

While the source of electricity supplying the circuit connecting the stationary electrodes 14 and 26 and the revolving electrode 16 is of high voltage, the current that flows when a spark occurs is very small. The intensity of the sparks passing between the conducting bridge 13 and the electrodes 14 and 16 and between the electrodes 26 and 16 may be made adjustable, if desired, by making a portion of the resistance 20 variable. By also making the potentiometer 21 variable, the voltage across the secondary output winding 25 of the transformer may be correspondingly regulated so as not to exceed the maximum voltage permissible in the transmission line. The frequency of the train of impulses passed to the transmitting circuit is determined by the speed of revolution of the transmitting motor 15, two impulses occurring during each revolution, namely when the revolving electrode 16 passes the stationary electrode 26 and the conducting bridge 13 respectively.

The receiving apparatus illustrated in Fig. 1 comprises a valve amplifier 27 for stepping-up the voltage of the received impulses and a stationary neon or similar gaseous lamp 28 mounted within a translucent drum 29 in a light-proof casing 30 provided with a viewing aperture 31, the transmitting circuit 24 being connected to the input terminals of said amplifier and the output terminals thereof being connected to the lamp 28. The drum 29 is mounted on the shaft 40 of a motor 32 which revolves in isochronism with the transmitting motor 15. The neon lamp 28 is flashed by each impulse transmitted over the circuit 24 and intermittently illuminates the drum 29 enclosing it. The amplifier 27 is so designed and adjusted that between flashes the lamp 28 shows no illumination. An arrow or other mark and a scale (corresponding in angular extent to the scale 12) are provided around the drum 29 as hereinafter described.

Any other suitable source of steady high voltage direct current may be substituted for the rectifier 18 at the transmitting station, and a thyratron gas-relay tube or any other suitable apparatus for flashing a neon lamp by the magnification of minute voltage variations may take the place of the valve amplifier 27 at the receiving station. The amplifying means may be designed for operation either from accumulators or from A. C. or D. C. supply mains. The motors 15, 32 may also be constructed to be run from accumulators or from A. C. or D. C. supply mains, and, when said motors are not of synchronous type, they may have their speeds maintained constant by employing phonic wheel control from frequency-controlled A. C. supply mains, or by other known electrical or mechanical methods.

Fig. 2 illustrates an alternative construction of impulse-originating device wherein the conducting bridge comprises a blade 13a mounted at right angles to and insulated from the oscillating pointer 11, and a stationary disc electrode 14a is substituted for the segmental electrode 14. The arm 17 carrying the revolving electrode 16 is straight so that said electrode revolves in a plane parallel to the face of the electrode 14a at a distance therefrom greater than the maximum gap which can be jumped by the voltage employed. The gap between the conducting blade 13a and the edge of the electrode 14a and the gap between said blade and the revolving electrode 16 are together slightly less than the maximum sparking distance. The stationary electrode 26 is carried by a fixed arm 33 projecting from the support 34 on which the electrode 14a is mounted so as to be angularly adjustable when it is desired to present a fresh edge portion of said electrode should it be found that the edge portion over which the blade 13a oscillates has become pitted by the sparks in course of time. The disc electrode 14a and the stationary electrode 26 are connected to one terminal of the rectifier 18, and the revolving arm 17 and electrode 16 are connected to the potentiometer 21 through an insulated slip ring 35 on the shaft of the transmitting motor 15 and a brush 36.

It will be understood that the conducting bridge 13 or blade 13a need not necessarily be mounted on the oscillating pointer 11, but may be on an extension thereof or on a member attached at any angle thereto or coupled thereto by gearing, so long as said bridge swings in agreement with said pointer. Also, if desired, a stationary conducting bridge may be substituted for the stationary electrode 26, said stationary bridge being disposed in the same relation to the segmental electrode 14 or 14a and the revolving electrode 16 as the oscillating bridge 13 or 13a but in the angular position of the electrode 26, so that, instead of the index impulse being originated by a single spark between the electrodes 16 and 26, said impulse will, like the signal impulse, be originated by a double spark between the electrode 14 (extended as necessary) or 14a, the stationary bridge and the revolving electrode 16 at the instant the latter passes said stationary bridge.

In previous stroboscopic signaling systems, in order to lessen the possibility of error arising from unobserved angular displacement of the shaft of one synchronous motor in relation to the shaft of the other motor, it is customary to transmit a synchronizing index impulse during each revolution of the transmitting motor to signal the angular position of a stationary mark on the path of the rotary member, synchronization being verified by the appearance of the indication due to said index impulse in the anticipated angular position in relation to the customary fixed scale of the receiving device. This practice has the disadvantage that there is some risk that the observer at the receiving station may fail to notice a displacement of the index indication in relation to said fixed scale and may take as accurate the simultaneously equally displaced indication which corresponds to the oscillating pointer, and be misled.

The receiving device of my improved signaling system is differentiated from the systems above referred to in that I utilize the transmitted index impulses in combination with the transmitted signal impulses to produce the complete indication at the receiving station without reference to a fixed external scale, thus making the received signals independent of simultaneous phase displacement and ensuring that the accuracy of the indication given by said signals is not effected thereby. Under these conditions the motor of my receiver requires only to revolve in isochronism (i. e. to concur in period but not necessarily also in phase) with the motor of the transmitter to determine the accuracy of the signaled indications.

As illustrated in Fig. 3, the translucent drum 29 of the receiving apparatus which forms the indicator member has inscribed on its surface an arrow 36 and also a scale 37 corresponding to the scale 12 of the transmitter. The tip of the arrow 36 is in alignment with the edge of the scale 37 or may slightly overlap it, and the angular distance between said arrow and the adjacent end of said scale is the same as that between the stationary electrode 26 of the transmitter and the adjacent end of the scale 12 over which the originating pointer 11 oscillates. It will be noticed however that the scale 37 and the arrow 36 both lie within the same half of the circumference of the drum. The viewing aperture 31 in the opaque casing 30 of the receiver extends across the paths of said scale and arrow, but the angular extent of said aperture does not exceed twice the angular distance between the arrow 36 and the adjacent end of the scale 37 so that, when the arrow is being illuminated in the centre of said aperture, the adjacent end of the scale is at that instant invisible.

In action, during each revolution of the transmitting and receiving motors 15 and 32 in the directions indicated by the arrows 59, 60 in Figs. 1 and 3, two impulses are transmitted to the neon lamp 28 and the surface of the revolving drum 29 is twice illuminated thereby, said impulses being in the order of (1) an index impulse at the instant the revolving electrode 16 passes the stationary electrode 26, and (2) a signal impulse at the instant the electrode 16 passes the conducting bridge 13 or 13a on the pointer 11. If the speed of rotation of the motors is, say, 750 revolutions per minute, the frequency of the flashes of the neon lamp illuminating the arrow 36 and the scale 37 is sufficiently high to produce the appearance of continuous steady visual indications. It will be noticed that the greater part of the periphery of the drum 29 is screened by the casing 30, and that, in each revolution, if the lamp flash due to one impulse occurs when the arrow 36 is centrally within the aperture 31, the corresponding relative angular positions of the stationary electrode 26 and the scale 12 of the transmitter and the arrow 36 and scale 37 of the receiver ensures that the flash due to the other impulse occurs when a segment of the scale 37 is within said aperture. When the index impulse occurs during the fraction of time during which the arrow 36 is travelling past the aperture 31, the illuminated arrow appears stationary due to said impulse occurring at the same instant in each revolution, and the scale 37, which is illuminated by the signal impulse, appears to move past the arrow 36 in exact agreement with the movements of the originating pointer 11 over the scale 12 of the transmitter, the illuminated appearance of the arrow and scale in conjunction giving the complete indication which corresponds to the reading of the instrument at the transmitting station.

Because the scale 37 and the arrow 36 are both positioned within one half of the circumference of a circle, there is only one place on the surface of the drum 29 where the illuminated arrow can be seen alongside the illuminated scale; the alternate illumination of the arrow due to the flash originated by the signal impulse shows it alone, and therefore no alternate reading on the scale is indicated on any other part of said surface which could be mistaken for the true reading, if seen in the viewing aperture. The aperture 31 is provided at any convenient angular position in the casing 30, and the peripheral position on the drum 29 where the illuminated arrow appears in conjunction with the illuminated scale is brought into coincidence with said aperture by angularly adjusting the housing of the motor 32 by means of the handle 52, or the casing 30 may itself be angularly adjusted and the casing and motor then locked together and revolved in respect to the observer to compensate for said adjustment, the latter method being convenient where the indicator member rotates in a horizontal plane instead of in a vertical plane as shown in the drawings.

Where the scale 12 of the transmitter lies within a quadrant of a circle and its angular extent is a few degrees less than a right angle, the effect of a pointer oscillating in relation to a stationary scale can be obtained in the receiving device by reversing the order in which the components of the complete indication (i. e. the arrow 36 and scale 37) follow one another upon the drum 29. Where the scale follows the arrow in the direction of rotation, the arrow is the stationary component of the signaled indication; where the arrow follows the scale, the arrow is the oscillating component.

An alternative arrangement of receiving indicator is illustrated in Fig. 4 wherein a translucent disc 29a is substituted for the drum 29 on the shaft 40 of the motor 32, a segmental viewing window 31a of angular extent to accommodate the scale 37 and sufficient marginal space at each end takes the place of the viewing aperture 31, and a segmental neon tube 28a is substituted for the lamp 28. The arrow 36 and scale 37 are provided within the same half of the disc 29a, the arrow being angularly spaced away from the adjacent end of the scale by a distance equal to the angular extent of the scale plus one of the aforesaid marginal spaces, namely the space required to separate the nearest approach of the two illuminated scale positions when the arrow is illuminated at the other extremity of the scale with the latter centralized within the viewing window. The stationary electrode 26 of the transmitter is positioned to correspond with the place occupied by the arrow on the disc 29a. In this example, the scale 37 precedes the arrow 36 in the direction of rotation which is shown by the arrow 60 and the illuminated indication is that of a stationary scale (due to the index impulse originated by the stationary electrode 26) and an oscillating arrow (due to the signal impulse originated by the oscillating bridge 13 or 13a). An accurate indication of the position of the pointer 11 in respect to the scale 12 at the transmitting station is given where the illuminated arrow appears alongside the illuminated scale in the window 31a.

If desired, the neon lamp or tube 28 or 28a may be placed outside of the drum 29 or in front of the disc 29a, in which case the drum or disc may be of opaque material.

It will now be seen that the receiving devices herein described and illustrated overcome the disadvantages hereinbefore referred to, and are differentiated from existing receiving devices in that they provide the appearance of a continuously illuminated arrow and scale on the same revolving indicator member and therefore their visible association, constituting the signaled indication, is quite independent of reference to any fixed mark external to said revolving member. The absence of one of the components of the complete indication is immediately apparent to the observer and cannot be overlooked, it being impossible for him to take a reading of the transmitted indication unless both the scale and arrow are simultaneously seen in association. The reading shown by the arrow on the scale always indicates the true angular displacement of the index and signal impulses.

Where it is desired to simultaneously transmit the readings of a number of instruments, the conducting bridges of the oscillating pointers of the instruments at the transmitting station are arranged to oscillate in different segments of a circle so that, during each revolution of the transmitting motor, index and signal impulses for each of the several instruments are transmitted in alternate succession, a revolving selector switch being provided at the receiving station to distribute the impulses received to the lamps illuminating the respective corresponding indicators.

Such an arrangement is illustrated in Fig. 5 as applied to four instruments a, b, c, d at the transmitting station, it being understood that the scales 12 of the instruments extend through less than 90° and the pointer 11 of each instrument is provided with a conducting bridge 13 co-acting with a stationary segmental electrode 14 and a revolving electrode 16 as hereinbefore described, the conducting bridges of the four instruments being arranged to oscillate within successive quadrants by mounting said bridges, where necessary, on arms 11a integral with or attached to the pointers 11. The four revolving electrodes 16 are simultaneously driven at the same speed through suitable gearing 38 on the extended shaft 39 of the transmitting motor 15, either directly as shown or by a friction drive or flexible shaft therefrom. The four segmental electrodes 14 are all connected to one side of a large reservoir condenser such as 22 (Fig. 1) which is maintained fully charged by a rectifier such as 18 (Fig. 1), and the four revolving electrodes 16 are all connected to earth and through a potentiometer and a high-value non-inductive resistance such as 21, 20 (Fig. 1) to the other side of said condenser as hereinbefore described.

If desired, instead of arranging the conducting bridges 13 to oscillate in relatively different segments of four circles as shown, they may oscillate in the corresponding segment of each circle, the revolving electrodes 16 being then relatively spaced 90° apart.

Fig. 7 shows a circle representing a single revolution of the transmitting motor 15, said circle being divided into arcs $a^2$, $b^2$, $c^2$, $d^2$ corresponding in angular extent and relative position to the segmental electrodes 14 over which the conducting bridges 13 of the transmitting instruments $a$, $b$, $c$, $d$ of Fig. 5 oscillate, the positions of the respective stationary electrodes 26 of said instruments being represented by the points $a^3$, $b^3$, $c^3$, $d^3$. The arrow 50 indicates the direction in which the revolving electrodes 16 of the four instruments rotate over the stationary electrodes 14 and 26, and it will be noticed that the revolving electrode of each instrument passes the stationary electrode ($a^3$, $b^3$, $c^3$ or $d^3$) in advance of the segmental electrode ($a^2$, $b^2$, $c^2$ or $d^2$) of said instrument so that the index impulse for each instrument precedes the signal impulse, and it will further be noticed that the angular distance between the stationary point electrode and the adjacent end of the segmental electrode of each instrument is greater than the angular extent of its segmental electrode as hereinbefore specified. The stationary point electrodes are arranged midway of the gaps between the segmental electrodes, the angles between the electrodes $a^3$, $b^3$ and $b^3$, $c^3$ being 90°, but, for the purpose of ensuring correct synchronization of the transmitting instruments and receiving indicators as hereinafter explained, the electrode $d^3$ (corresponding to the stationary electrode 26 of the transmitter $d$) is advanced 2° in the direction of rotation so that the angle between the electrodes $c^3$, $d^3$ is 92° and the angle between the electrodes $d^3$, $a^3$ is 88°.

At the receiving end, as shown in Fig. 6, the indicators are marked $a^1$, $b^1$, $c^1$, $d^1$ to correspond with the transmitting instruments with which they are associated and their indicator members are of the disc type illustrated in Fig. 4 designed to show an oscillating illuminated arrow 36 in conjunction with a stationary illuminated scale 37. The disc 29a of the four indicators are simultaneously revolved at the same speed as the electrodes 16 at the transmitter by gearing 45 on the extended shaft 40 of the receiving motor 32 or by other means, the discs and their tubular lamps 28a being housed in opaque casings 30 which prevent interleakage of light. The lamps are fed from the amplifier 27 (Fig. 1) through a common lead 41 and through insulated brushes 42, 43 co-acting with a revolving selector switch 44 comprising conducting rings 46 and segmental contacts 47, 48 with interposed segments 49 of insulating material assembled together in barrel form and mounted on but insulated from the shaft 40 of the motor 32. The sets of short and long contacts 47, 48 are grouped in pairs for facility of construction, but they may be conductively mounted so as to employ a single common slip-ring with a single input brush. If desired, drum type indicator members illuminated by segmental neon tubes may be substituted for the disc type indicator members shown in Fig. 6, said drum-type indicator members being of large diameter to eliminate observational errors due to parallax.

Fig. 8 shows concentric circles representing a single revolution of the receiving motor 32, the inner circle being an end elevation of the contacts 47, 48 of the selector switch 44 on which the short arcs $a^4$, $b^4$, $c^4$, $d^4$ correspond in angular extent and relative position to the contacts 47 which transmit the index impulses to the lamps of the four indicator members of the receiving apparatus, said contacts being angularly arranged to agree with the stationary electrodes 26 of the transmitting instruments (i. e. with the points $a^3$, $b^3$, $c^3$, $d^3$ of Fig. 7), and the long arcs $a^5$, $b^5$, $c^5$, $d^5$ correspond in angular extent and relative position to the contacts 48 which transmit the signal impulses, it being understood that the contacts 47, 48 of the respective pairs are in circumferential alignment but said pairs are axially spaced apart. As the duration of the impulses (apart from the peripheral extent of the brushes 43) occupies a minimum space of about 1°, on the surface of the switch barrel, it is necessary in working for this space generally to exist between the ends of the long contacts 48 and the occurrence of the appropriate signal impulses to ensure that when the pointers of the transmitting instruments are at either extremity of their scales, the signal impulses will still wholly occur on each long contact. To permit of this space allowance, the scales 37 of the indicator members and the segmental electrodes 14 of the transmitting instruments are made 2° less in angular extent than the corresponding long contacts 48 (represented by the arcs $a^5$, $b^5$, $c^5$, $d^5$). The short contacts 47 (represented by the arcs $a^4$, $b^4$, $c^4$, $d^4$) are shown as being of 4° in extent.

The arcs $a^6$, $b^6$, $c^6$, $d^6$ around the outer circle in Fig. 8 indicate the angular extent and relative positions of the scales 37 on the four discs 29a of the receiving indicators, and the arrows $a^7$, $b^7$, $c^7$, $d^7$ indicate the relative angular positions of the arrows 36 respectively associated with said scales. The scales agree in angular extent with the segmental electrodes 14 of the corresponding transmitting instruments, and it will be noticed that the arcs $a^6$, $b^6$, $c^6$, $d^6$ representing the scales are symmetrically arranged in relation to the arcs $a^4$, $b^4$, $c^4$, $d^4$ representing the short contacts 47 which transmit the index impulses producing the appearance of illuminated stationary scales in the viewing windows 31a of the receiving indicators, while the arrows $a^7$, $b^7$, $c^7$, $d^7$ are placed so as to bi-sect the arcs $a^5$, $b^5$, $c^5$, $d^5$ representing the long contacts 48 which transmit the signal impulses producing the appearance of illuminated moving arrows in said windows. Assuming the discs 29a to be observed from the rear, the arrow 51 indicates the direction in which the selector switch 44 and the discs 29a of the indicators revolve, the brushes 42, 43 which bear on the switch contacts 46, 47, 48 being stationary.

Fig. 9 is a development of the selector switch 44 and shows clearly the arrangement of the four pairs of segmental contacts 47, 48, the rings 46 conductively coupling them together, and the interposed segments 49 of insulation material. In this figure the contacts 47, 48 are also marked $a^4$, $b^4$, $c^4$, $d^4$ and $a^5$, $b^5$, $c^5$, $d^5$ to correspond with Fig. 8.

It will now be seen that, as the selector switch 44 is revolved simultaneously with the indicator discs 29a by the receiving motor 32 and the latter runs in agreement with the transmitting motor 15 and hence with the revolving electrodes 16, the succession of index and signal impulses originated during each revolution of the motors is distributed by the brushes 43 (which are of minimum angular extent), and the contacts 47, 48 of the switch to the lamps 28a of the several indicators in sequence, and the scales and arrows of the discs are therefore illuminated in alternate succession. As the successive illumination of the scale and arrow representing each instrument at the transmitting station occurs within a single revolution of the motors and as the speed of the motors is desirably not less than 12.5 revolutions per second, the effect produced in the viewing windows 31a is that of simultaneous steady illumination of all four scales and arrows.

Owing to the described arrangement of the stationary electrodes 26 and of the corresponding contacts 47 of the selector switch, it will be found that only when the transmitting and receiving motors are running in corresponding phase (i. e. in synchronism) can the illuminated scales of all four indicators be made to appear centrally disposed in the viewing windows 31a, and said central disposition of the illuminated scales proves that the indication given by the arrow in conjunction with the scale of each indicator corresponds to the actual position of the pointer of the transmitting instrument with which said indicator is correctly intended to represent. A phase displacement of either motor through one, two or three quadrants (which, if the stationary point electrodes were all regularly spaced, would have the effect of incorrectly distributing the transmitted impulses) results in the present case in the illuminated scales being unequally displaced to one side or the other of their windows and so warning the observer that the indications are not in their correct order and that angular adjustment of the receiving motor is required to correct said phase displacement. Once phase agreement has been established, further adjustment is unnecessary and the indicators will continue to give continuous visual indications of the readings of their corresponding instruments at the transmitting station.

It is necessary for correct operation that each index impulse shall arrive when a brush 43 bears on the centre of a contact 47 of the selector switch so that each scale is centrally disposed within its viewing window, and the 1° minimum spacing of the signal impulses from either extremity of the contacts 48 is provided, as above described. The position of the brushes 43 can be considered in the diagram Fig. 9 to be on the line 43—43. As the contacts 47 extend through a desirable minimum extent of 4°, a slight peripheral displacement of the centre of said contacts in relation to the index impulses may be permitted to occur without failure to transmit all the impulses (i. e. if none of the transmitting pointers is at the extremity of its scale), and said allowable displacement provides an alternative or additional method of verifying the correct order of illumination of the indicators. For this purpose and as shown in Figs. 6 and 10, the housing of the receiving motor 32 is fitted with a small movable scale 53 (enlarged by magnification, if desired) which can be brought alongside a fixed pointer 54 on the base 55 of said motor so that the extent of adjustment of said housing can be accurately measured. The scale is mounted on a sliding carrier 56 in a dove-tailed groove 57 around the housing of the motor, said carrier being prevented from slipping by a spring 58 interposed between it and the bottom of the groove. Centralization of the brushes 43 on the contacts 47 can be readily tested by slightly oscillating the motor housing and noticing in respect to a central zero mark inscribed on the scale 53, whether the housing can be swung equally in each direction about the pointer 54 before any of the indications in the windows 31a are seen to be disturbed. If, on slowly oscillating the motor housing, it is found that all four indications become disturbed in their windows over a maximum amplitude of swing, this is proof that the indicators tally with the transmitting instruments; if, however, one indication is disturbed in advance of the other indications (i. e. the amplitude of swing has to be reduced to avoid affecting the illumination of any one of the indicators), angular adjustment of the receiving motor is then necessary.

The angular dimensions given in the foregoing description of Figs. 7, 8 and 9 represent the maximum and approximately equal scale lengths for the simultaneous transmission of signals from four instruments while providing for the necessary desirable minimum interspaces between the scales and arrows on the surfaces of the indicator members for a moving pointer over a stationary scale effect to be obtained, after allowing for the relative displacement of one index impulse to ensure correct synchronization.

The arrangement described for four instruments at the transmitting station can be similarly applied to two, three, five or six instruments, the circles being divided into segments in like manner to those described in connection with four instruments with the scales and arrows similarly disposed to include the provision of one displaced index impulse for synchronizing the motor at the receiving station with that at the transmitting station. As the motors must operate in synchronism for multiple signaling, scales extending beyond 90° may be used in the case of two or three instruments, but, where the positions of the pointers of five or six instruments are to be transmitted simultaneously, the length of the scales requires to be less than depicted in Figs. 5–8.

If the effect of a scale moving past a stationary pointer is desired in the indicators, the positions of the scale and arrow on each indicator member are interchanged, illumination of the scale being then controlled by the long segmental contact of the selector switch which conveys the signal impulses from the corresponding transmitting instrument, while illumination of the arrow is controlled by the short contact which conveys the index impulses from said instrument. Since the arrow of each indicator now precedes the scale in the direction of rotation, the scale is figured or lettered in the reverse order, while the viewing windows approximate in size that of the aperture 31 in Fig. 3. This method of indicating the signaled indications allows of scales of widely varying lengths being used, since a space between the arrow and the adjacent end of its scale is not required to accommodate the whole scale length plus a margin as is needed for the effect of a pointer moving over a stationary scale.

What I claim as my invention and desire to secure by Letters Patent is:—

1. An electrical signaling system operating on the stroboscopic principle including impulse-originating apparatus comprising an insulated conducting member moving in agreement with an oscillating pointer the angular position of which is to be signaled, a stationary segmental electrode adjacent to said conducting member, a point electrode, means for maintaining said segmental electrode and said point electrode at considerable potential difference, means for revolving said point electrode at constant speed in a path adjacent to said conducting member, the gap between the path of said revolving point electrode and said conducting member and the gap between said conducting member and said stationary segmental electrode being such that sparks occur momentarily in said gaps at the instant when said revolving point electrode passes said conducting member and originate a signal impulse once during each revolution of said point electrode with said oscillating pointer in any position within the limits of its swing.

2. An electrical signaling system as claimed in claim 1 having, in addition to the revolving point electrode therein referred to, a stationary point electrode and a stationary conducting bridge conductively connected to the stationary segmental electrode, the gap between the path of said revolving point electrode and said stationary point electrode and bridge being such that a spark occurs momentarily in said gap at the instant when said revolving point electrode passes said stationary point electrode and bridge and originates an index impulse once during each revolution of said point electrode.

3. An electrical signaling system operating on the stroboscopic principle including impulse-originating apparatus comprising an insulated conducting member moving in agreement with an oscillating pointer the angular position of which is to be signaled, a stationary segmental electrode adjacent to said conducting member, a point electrode, means for maintaining said segmental electrode and said point electrode at considerable potential difference, means for revolving said point electrode at constant speed in a path adjacent to said conducting member, a stationary point electrode and a stationary conducting bridge conductively connected to said stationary segmental electrode, the gaps between the path of said revolving point electrode and said stationary point electrode and conducting bridge, between said path and said conducting member and between said conducting member and said stationary segmental electrode being such that sparks occur momentarily in said gaps when said revolving point electrode passes said conducting member and originate index and signal impulses once during each revolution of said point electrode, means for transmitting said index and signal impulses, and indicating apparatus for receiving said impulses comprising a gaseous lamp, means for flashing said lamp by the received index and signal impulses, an indicator member bearing two signal components, and means for revolving said indicator member in isochronism with the means for revolving the point electrode of the impulse-originating apparatus, said received impulses independently flashing said lamp to momentarily illuminate said signal components in succession which components combine to produce visually the appearance of a complete indication of the position of said oscillating pointer.

4. An electrical signaling system as set forth in claim 3 having an indicator comprising a revolving member bearing a representation of a scale over which the oscillating pointer swings and also an indicating mark, the positions of said scale representation and said indicating mark in relation to one another being determined by the angular relation of the arc through which said pointer swings to the stationary point electrode and conducting bridge of the impulse-originating apparatus.

WILLIAM HENRY DEAN.